Dec. 8, 1942.   R. H. PECKWORTH   2,304,276
AUTOMOBILE CONTROL DEVICE
Filed Nov. 22, 1940
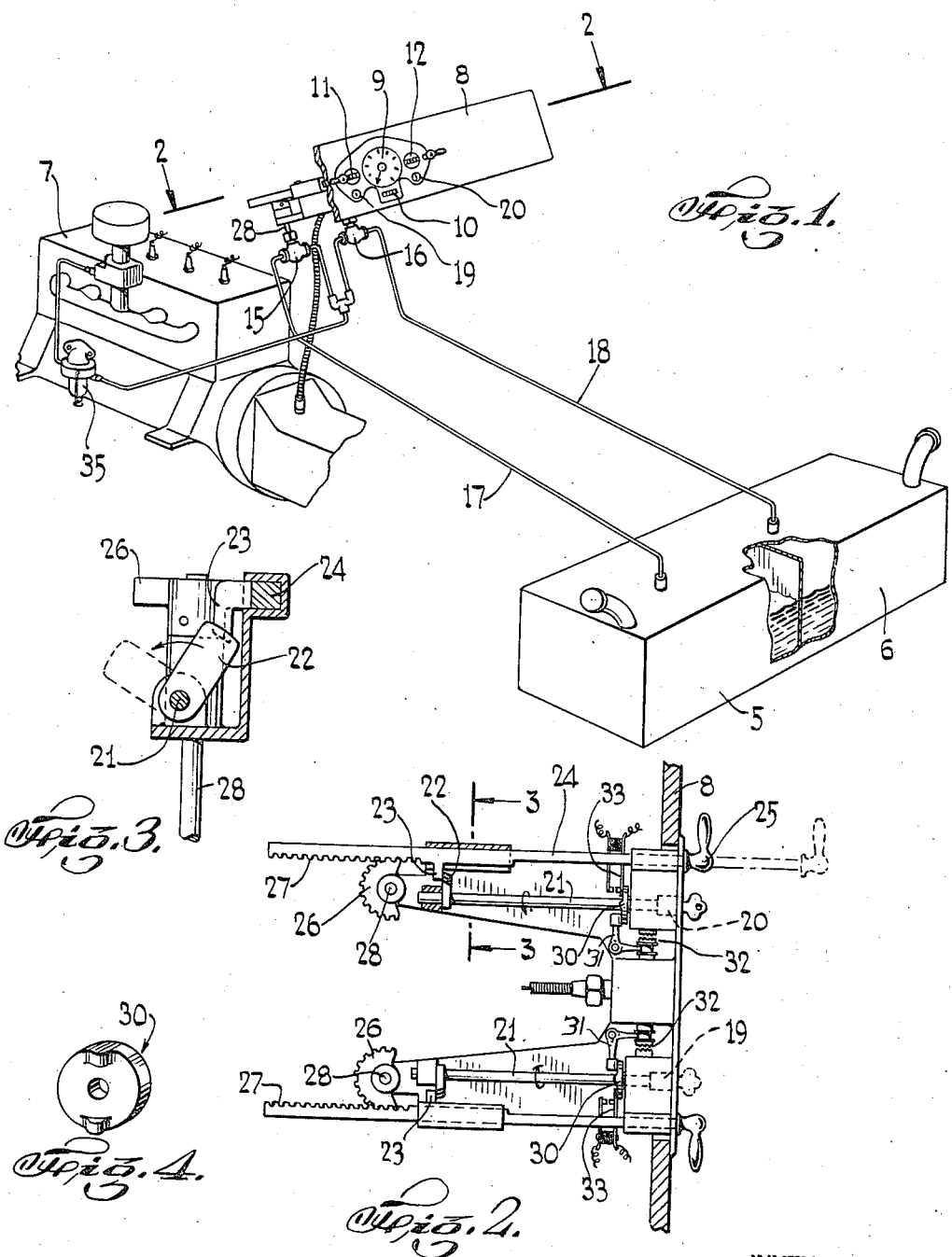
INVENTOR
RALPH H. PECKWORTH
BY Hammond & Littell
ATTORNEYS Patented Dec. 8, 1942

2,304,276

UNITED STATES PATENT OFFICE 2,304,276

AUTOMOBILE CONTROL DEVICE

Ralph H. Peckworth, Jersey City, N. J.

Application November 22, 1940, Serial No. 366,789

4 Claims. (Cl. 180—77)

The present invention relates to vehicles such as automobiles, tractors, boats, and aircraft which are to be operated by different parties in circumstances in which it is desirable to know the extent of use by each party.

The invention has been developed more particularly as applied to an automobile owned jointly by two persons who wish to share the expense of driving in proportion to the extent of use by each, and for the purposes of disclosing the principles of the invention, such an embodiment will be more particularly described.

The invention has for an object to provide means whereby, by the use of keys carried by the respective users of the vehicle, a record of the extent of use by each may be kept.

Another object is to provide a plurality of fuel tanks and means whereby each user of the vehicle may use fuel only from a single fuel tank to which he has access.

In the preferred embodiment of the invention the vehicle is provided with a plurality of tanks, each of which is connected by suitable piping to the intake of the engine. The supply line from each tank to the engine is controlled by a suitable key controlled valve. In order that a record of the mileage travelled by each user may be kept, a plurality of odometers are also arranged to be suitably connected for operation in conjunction with the corresponding tanks. Preferably one tank and one odometer are controlled by each key. The ignition system is unlocked for use by either key.

The nature and objects of the invention will be better understood by reference to the description of an illustrative embodiment for the purposes of which description, reference should be had to the accompanying drawing, forming a part hereof and in which—

Figure 1 is a diagrammatic view showing two fuel tanks for supplying fuel to an engine with odometers and control devices mounted on the dash board.

Fig. 2 is a sectional detailed view taken substantially on the line at 2—2 of Fig. 1.

Fig. 3 is a sectional detailed view taken on the line 3—3 of Fig. 2.

Fig. 4 is a perspective detailed view of an ignition and clutch operating cam.

Referring more particularly to the drawing two fuel tanks 5 and 6 are provided, either of which may be connected to deliver fuel to the engine 7. On the instrument board or dash 8 is provided the usual speedometer with dial 9 and beneath the dial odometer 10 showing a record of the total mileage. At either side of the dial are counters or meters 11 and 12, one of which may be connected to be driven to indicate mileage travelled when the corresponding fuel tank is connected for use. Key controlled means permits each operator to connect for use one fuel tank and a corresponding meter.

All controls for the flow of fuel from the fuel tanks and for connecting one or the other of the auxiliary meters are preferably mounted on the dash 8. Valves 15 and 16 are provided in the auxiliary feed lines 17 and 18 and these valves in turn may be operated under control of keys in locks 19 and 20. As shown in Fig. 2 a key insertable in lock 20 permits rotation of the shaft 21 to move a controlling lug 22 from position behind a stop 23 carried by a pull rod 24. When the rod 21 with lug 22 is rotated to the dotted line position as shown in Fig. 3 the operator may grasp the handle 25 of the rod 24 and by pulling it, rotate the gear segment 26 which meshes with the rack 27 on the rod 24, thereby rotating the valve stem 28 on which the gear segment is fixed. This operation opens the valve 16 to permit supply of fuel from the tank 6 to the engine.

The pull rods and the rack and segment connections for operating the two similar valve stems are similar and similar reference characters are applied thereto in the drawing.

The connections for causing operation of one or the other of the auxiliary meters are arranged to be operated by the rods 21 when turned. Any suitable arrangement may be provided for this purpose. As shown diagrammatically in Fig. 4, each rod 21 carries a cam 30 having one riser to actuate the bell crank lever 31, to operate a clutch 32, and a second riser to close an ignition switch 33. When the rod 21 is in locked position the clutch is withdrawn and the auxiliary meter is idle, but when the rod 21 is unlocked and rotated, the clutch engages to drive the meter from a shaft which is always connected to be driven. Beyond the valves 15 and 16 the auxiliary feed lines are connected to one main feed line which delivers fuel to the engine.

When either valve 15 or 16 is open, fuel will be drawn by the usual pump 35 to the carburetor of the engine. Also when either valve is open the corresponding auxiliary meter will be in operation to show the mileage traveled.

It will be understood that the fuel tanks may be provided with locks to prevent tampering therewith, as is usual in the art. The foregoing description of a particular embodiment exemplifying the principles of the invention, is illustrative merely and is not intended as defining the limits of the invention.

I claim:

1. In a vehicle the combination with an engine, a main fuel feed line therefor, and an ignition system including an electrical circuit, of two fuel tanks, auxiliary feed lines connecting the fuel tanks to the main feed line, valves controlling the auxiliary feed lines, key controlled means with two different keys therefor for controlling the valve of each auxiliary feed line, and connections between each key controlled means and the electrical circuit to close said circuit, whereby the possessor of one key can open the valve controlling one fuel tank to use fuel therefrom but not the other, and can operate the ignition system.

2. In a vehicle the combination with an engine and an ignition system including an electrical circuit, of two key controlled devices connected to prevent closing of the circuit when both devices are locked and to permit closing of the circuit when either device is unlocked, two meters, a meter driving member, alternative drive connections between the driving member and said meters to drive one or the other thereof and connections between the key controlled devices and the alternative drive connections to connect either meter to the driving member when the corresponding key controlled device is operated.

3. In a vehicle the combination with an engine and a main fuel feed line therefor of two separate fuel tanks, an auxiliary fuel feed connecting each tank to the main fuel feed line, a valve controlling each auxiliary feed line, a driving member, a main meter connected to said driving member to be driven thereby, two auxiliary meters, connections between the drive member and the auxiliary meters each including a clutch, two key-controlled rods, an operative connection between each key-controlled rod and a corresponding clutch, a connection between each key-controlled rod and a corresponding valve alternatively to open said valve or lock it in closed position, an ignition system, and means controlled by the key controlled rods to make operative the ignition system.

4. In a vehicle the combination of an engine, a main fuel feed line therefor, two separate fuel tanks, two meters, auxiliary feed lines connecting the tanks to the main fuel feed line, a valve in each auxiliary fuel feed line, alternative drive connections between the engine and said meters to drive one or the other thereof, and separate key controlled locks, each connected to control one valve and one of the alternative drive connections, whereby upon operation of one key controlled lock fuel will be drawn from one tank and one meter will be driven, and upon operation of the other key controlled lock the other tank will be connected and the other meter will be driven.

RALPH H. PECKWORTH.